United States Patent
Kobayashi et al.

(10) Patent No.: US 7,071,273 B2
(45) Date of Patent: Jul. 4, 2006

(54) TETRAFLUOROETHYLENE COPOLYMER, ITS PRODUCTION METHOD AND PASTE EXTRUDED PRODUCT

(75) Inventors: Shigeki Kobayashi, Chiba (JP); Shinya Higuchi, Chiba (JP); Masataka Arai, Chiba (JP); Hiroki Nagai, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/992,718

(22) Filed: Nov. 22, 2004

(65) Prior Publication Data

US 2005/0064195 A1 Mar. 24, 2005

Related U.S. Application Data

(63) Continuation of application No. PCT/JP03/14742, filed on Nov. 19, 2003.

(30) Foreign Application Priority Data

Dec. 6, 2002 (JP) ............................. 2002-355575
Aug. 15, 2003 (JP) ............................. 2003-207631

(51) Int. Cl.
C08F 16/24 (2006.01)
C08F 116/12 (2006.01)
C08F 26/00 (2006.01)

(52) U.S. Cl. ...................... 526/247; 526/250; 526/234; 526/919

(58) Field of Classification Search ................. 526/247
See application file for complete search history.

(56) References Cited

U.S. PATENT DOCUMENTS 6,822,060 B1 * 11/2004 Kobayashi et al. ......... 526/250
6,911,513 B1 * 6/2005 Kashiwagi et al. ......... 526/252
2005/0064195 A1   3/2005 Kobayashi et al.

FOREIGN PATENT DOCUMENTS

| JP | 63-56532 A | 3/1988 |
| JP | 63-238115 A | 10/1988 |
| JP | 05-170834 | * 7/1993 |
| JP | 5-170834 | 7/1993 |
| JP | 5-186532 A | 7/1993 |
| JP | 2000-136280 A | 5/2000 |

OTHER PUBLICATIONS

U.S. Appl. No. 11/080,636, filed Mar. 16, 2005, Oharu et al.

* cited by examiner

*Primary Examiner*—David W. Wu
*Assistant Examiner*—Ives Wu
(74) *Attorney, Agent, or Firm*—Oblon, Spivak, McClelland, Maier & Neustadt, P.C.

(57) ABSTRACT

Provided are a tetrafluoroethylene copolymer excellent in paste extrudability, which comprises a unit based on tetrafluoroethylene and a unit based on a monomer represented by a formula of $CF_2=CF-O-(CF_2)_nCF=CF_2$ (wherein n is an integer of from 1 to 6), wherein a content of the unit based on the monomer represented by the formula is from 0.1 to 0.5% by mass, wherein a particle size of a primary particle is from 0.1 to 0.5 μm, wherein a standard specific gravity is from 2.14 to 2.25, wherein a paste extrusion pressure is from 24.5 to 73.5 MPa and wherein the copolymer remains not undergoing melt molding; a fine powder of a tetrafluoroethylene copolymer; and a production method and a paste extruded product thereof. The TFE copolymer is excellent in paste extrudability and the molded product thereof is excellent in heat resistance and transparency.

4 Claims, 1 Drawing Sheet

US 7,071,273 B2

TETRAFLUOROETHYLENE COPOLYMER, ITS PRODUCTION METHOD AND PASTE EXTRUDED PRODUCT

TECHNICAL FIELD

The present invention relates to a tetrafluoroethylene copolymer (hereinafter referred to as "TFE copolymer") with excellent paste extrudability, heat resistance and transparency, its production method and its paste extruded product.

BACKGROUND ART

Fine powder of polytetrafluoroethylene (hereinafter referred to as "PTFE") is produced by coagulating polymer fine particles obtained by a so-called emulsion polymerization in which tetrafluoroethylene (hereinafter referred to as "TFE") is polymerized in an aqueous medium with use of an emulsifier. It is technically known that PTFE is modified by copolymerizing TFE with a relatively small amount of a comonomer copolymerizable therewith.

It is also known that modification of PTFE is effective for improving processability in paste extrusion of fine powder with an appropriate coagent as an additive.

JP-B-37-4643 describes a polymerization method of a modified PTFE in which a modifier is added to a polymerization system before 70% of a predetermined amount of TFE is consumed, and describes examples of the modifier such as a perfluoroalkyltrifluoroethylene comonomer represented by hexafluoropropylene (hereinafter referred to as "HFP") and a chain transfer agent represented by methanol.

Furthermore, JP-B-44-14937 proposes use of two kinds of initiators consisting of a persulfate and a disuccinic acid peroxide, in a system containing perfluoroalkyltrifluoroethylene or perfluoroalkyloxytrifluoroethylene as a comonomer. JP-B-56-26242 proposes formation of a core-shell structure using a chlorotrifluoroethylene (hereinafter referred to as "CTFE") comonomer.

JP-B-56-26243 proposes addition of HFP, ω-hydroperfluoroolefin or vinylidene fluoride after polymerization of 70% of the total amount of monomers.

JP-B-57-18529 proposes formation of a core-shell structure using HFP or ω-hydroperfluoroolefin as a comonomer.

It is known that the modified PTFE fine powder obtained by these methods is excellent in extrudability but low in heat resistance. Therefore, JP-B-04-3765 proposes a core-shell structure composed of a copolymer with a linear-fluoroalkyl or chain-fluoroalkyl vinyl ether comonomer for the core and a copolymer with CTFE for the shell, in order to improve the heat resistance. However, it is insufficient in terms of reliable heat resistance because the copolymer has units based on thermally unstable CTFE.

Moreover, JP-B-03-66926 and JP-B-08-26102 propose methods of modifying PTFE using Rfa-CH=CH$_2$ (Rfa is a perfluoroalkyl group) as a comonomer. They describe the methods of continuously adding the comonomer up to a midway point of the polymerization in order to increase the degree of modification at an early stage. This comonomer is also inadequate to achieve reliable heat resistance because its structure is not a perfluoro-structure but a hydrogen-containing structure. In particular, further improvement in the heat resistance is recently required with increasing demands for the heat resistance of parts due to environmental measures to automobile exhaust emissions.

JP-A-09-87334 proposes an improvement in the heat resistance by making a core-shell structure composed of a copolymer with a perfluorobutylethylene comonomer for the core and a copolymer with a HFP comonomer for the shell (at least 75% of the yield).

In addition, the brochure of WO00/02935 proposes an improvement in the heat resistance by making a core-shell structure composed of a copolymer with a linear-fluoroalkyl or chain-fluoroalkyl vinyl ether comonomer for the core and PTFE obtained with a chain transfer agent added in the polymerization of TFE for the shell (at least 80% of the yield).

Furthermore, JP-A-05-170834 describes a TFE copolymer capable of undergoing melt molding, which is a copolymer of TFE with a slight amount of CF$_2$=CF—O—(CF$_2$)$_n$CF=CF$_2$ (where n is an integer of from 1 to 6). However, it fails to describe whether or not the TFE copolymer can undergo paste extrusion.

U.S. Pat. No. 6,479,591 discloses a TFE copolymer of a core-shell structure in which the core is made by copolymerization of a slight amount of a specific cyclic monomer or ring-forming monomer and in which the shell is made by copolymerization of HFP.

As described above, studies have been made on the use of the binary system of the persulfate and the disuccinic acid peroxide as a polymerization initiator, and on the TFE copolymers with both excellent paste extrudability and excellent heat resistance by the core-shell structure composed of the combinations of various comonomers conventionally known. However, the perfluoro monomer is generally low in reactivity and has a drawback in productivity and, for further improvements in the moldability, transparency, heat resistance, and so on, there have been needs for a comonomer having a novel structure, and for a TFE copolymer of a novel composition using the comonomer.

An object of the present invention is to provide a TFE copolymer and a fine powder thereof with excellent paste extrudability, heat resistance and transparency, which is a TFE copolymer produced by copolymerization of TFE with a comonomer having good copolymerization reactivity with TFE.

DISCLOSURE OF THE INVENTION

The present invention provides a tetrafluoroethylene copolymer with excellent paste extrudability comprising a unit based on tetrafluoroethylene and a unit based on a monomer represented by the following general formula (1), wherein a content of the unit based on the monomer represented by the general formula (1) is from 0.1 to 0.5% by mass, wherein a particle size of a primary particle is from 0.1 to 0.5 μm, wherein a standard specific gravity is from 2.14 to 2.25, wherein a paste extrusion pressure is from 24.5 to 73.5 MPa and wherein the copolymer remains not undergoing melt molding,

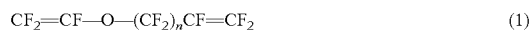

$$CF_2=CF-O-(CF_2)_nCF=CF_2 \qquad (1)$$

(wherein n is an integer of from 1 to 6).

The present invention also provides a method for producing a tetrafluoroethylene copolymer comprising effecting an emulsion polymerization of tetrafluoroethylene with a monomer represented by the general formula (1) under such a condition that a polymerization amount of the monomer represented by the general formula (1) is in a range of from 0.1 to 0.5% by mass, thereby obtaining a tetrafluoroethylene copolymer for paste extrusion which has a particle size of a primary particle of from 0.1 to 0.5 μm, a standard specific gravity of from 2.14 to 2.25, and a paste extrusion pressure of from 24.5 to 73.5 MPa and which remains not undergoing melt molding.

Furthermore, the present invention provides a paste extruded product obtained by paste extrusion of the tetrafluoroethylene copolymer as defined above.

The present invention also provides a fine powder of a tetrafluoroethylene copolymer for paste extrusion in a core-shell structure comprising a core of a tetrafluoroethylene copolymer having a unit based on tetrafluoroethylene and a unit based on a monomer represented by the general formula (1); and a shell of a tetrafluoroethylene polymer having a unit based on tetrafluoroethylene, wherein a content of the unit based on the monomer represented by the general formula (1) is from 0.1 to 0.5% by mass relative to a total amount of the units based on the tetrafluoroethylene in the core and in the shell, wherein a particle size of a primary particle is from 0.1 to 0.5 µm, wherein a standard specific gravity is from 2.14 to 2.25, wherein a paste extrusion pressure is from 24.5 to 73.5 MPa and wherein the powder remains not undergoing melt molding.

The present invention also provides the fine powder of the tetrafluoroethylene copolymer for paste extrusion as described above, wherein the tetrafluoroethylene copolymer of the shell contains a unit based on hexafluoropropylene, and wherein a content of the unit based on the hexafluoropropylene is from 0.002 to 0.3% by mass relative to the total amount of the units based on the tetrafluoroethylene in the core and in the shell.

BEST MODE FOR CARRYING OUT THE INVENTION

Figure 1:
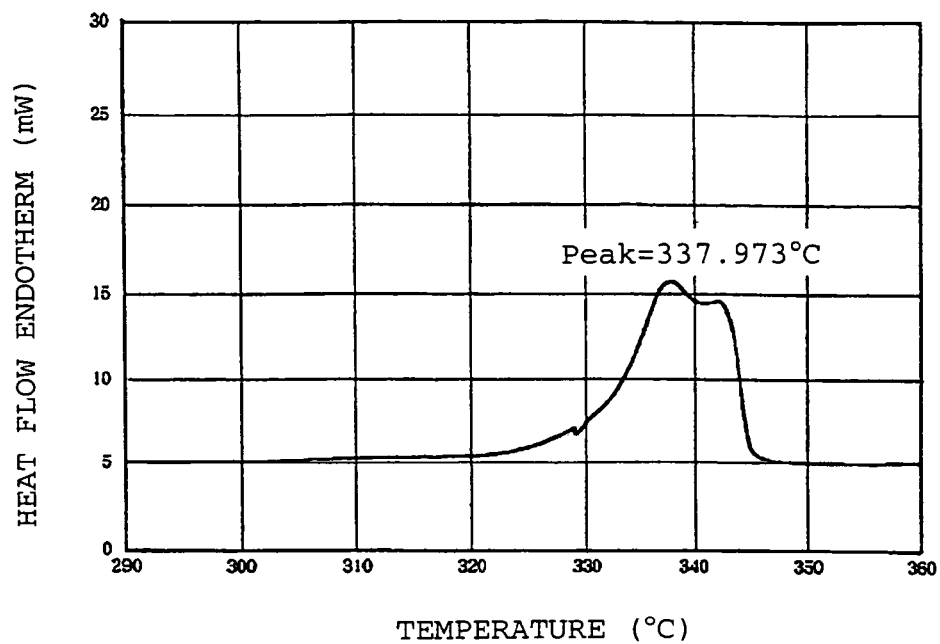
FIG. 1 shows a differential thermal analysis chart of a TFE copolymer in Example 1 of the present invention.

A TFE copolymer of the present invention comprises a unit based on the TFE and a unit based on the monomer represented by the general formula (1).

$$CF_2=CF-O-(CF_2)_nCF=CF_2 \quad (1)$$

The monomer of the general formula (1) has adequate copolymerization reactivity with TFE, provides the resulting TFE copolymer with flexibility, and is capable of improving the paste extrudability, heat resistance and transparency.

In the general formula (1), n is an integer of from 1 to 6, preferably an integer of from 2 to 5, particularly preferably 2. The monomer of the general formula (1) may be a mixture of monomers having different n's.

In the TFE copolymer of the present invention, a content of the unit based on the monomer represented by the general formula (1) is from 0.1 to 0.5% by mass, preferably from 0.11 to 0.45% by mass, more preferably from 0.12 to 0.4% by mass. If the content is more than 0.5% by mass, the polymerization rate will decrease, which is undesirable from the viewpoint of productivity. In addition, it will also result in increasing a paste extrusion pressure and tends to degrade the extrudability. On the other hand, if the content is less than 0.1% by mass, it will lead to increase of the paste extrusion pressure, degradation of appearance of an extruded product, and inadequate heat resistance and transparency, and thus fail to achieve substantial effect of modification.

In the TFE copolymer of the present invention, one or more other monomers can be used in combination with the TFE and the monomer of the general formula (1). In this case there are no particular restrictions on the structure of the other monomers used in combination as long as they are polymerizable compounds which can be copolymerized with TFE. However, from the viewpoint of the heat resistance of the resulting TFE copolymer, they are particularly preferably of a fluorine-containing structure; for example, a polymerizable perfluoro compound. A content of units based on the other monomers is preferably so adjusted that the total content of the units based on the monomer of the general formula (1) and based on the other monomers is from 0.1 to 0.5% by mass, particularly preferably from 0.12 to 0.4% by mass.

The TFE copolymer of the present invention can be produced by a polymerization method such as an emulsion polymerization method.

Charge amounts of the TFE and the monomer of the general formula (1) may be so determined that the content of the unit based on the monomer of the general formula (1) in the TFE copolymer is in a range of from 0.1 to 0.5% by mass, and, preferably, a polymerization amount of the monomer of the general formula (1) is in a range of from 0.1 to 0.5% by mass.

The monomer of the general formula (1) can be added at once at an initial stage, or can also be consecutively added after an addition at an initial stage.

A chain transfer agent is preferably added at a late stage of the polymerization reaction of the TFE copolymer of the present invention, for example, at a point where at least 70% of the raw monomers have reacted. In particular, the chain transfer agent is preferably added to the reaction system at a point where 75 to 95% of the raw monomers have reacted, and it is more preferably added to the reaction system at a point where 80 to 95% of the raw monomers have reacted. If the chain transfer agent is added at a too early stage or in a too large amount, the TFE copolymer will increase low-molecular-weight parts to decrease the extrusion pressure too much, whereby microvoids will appear in an extrudate of the TFE copolymer to cause whitening. In addition, it can cause deterioration of mechanical properties of a molded product itself. Examples of the chain transfer agent usable herein include water-soluble organic compounds as represented by methanol, alkanes such as methane, ethane and propane, hydrogen and various types of halogenated hydrocarbons, among which methanol is particularly preferred. With use of the chain transfer agent, a fine powder of TFE copolymer is obtained in a structure composed of a core of the TFE copolymer resulting from copolymerization of the monomer of the general formula (1), and a shell of the TFE polymer.

It is also preferable to use HFP instead of the chain transfer agent at a late stage of the above polymerization reaction. With addition of the HFP at a late stage, a fine powder of TFE copolymer is obtained in a structure composed of a core of the TFE copolymer resulting from copolymerization of the monomer of the general formula (1) and a shell of the TFE copolymer resulting from copolymerization of HFP.

An amount of the chain transfer agent or the HFP to be added is preferably from 0.002 to 0.3% by mass relative to the total amount of the units based on tetrafluoroethylene in the core and in the shell, more preferably from 0.005 to 0.3% by mass, particularly preferably from 0.006 to 0.25% by mass.

The emulsion polymerization method is a method employing an aqueous medium, an emulsifier, a stabilization coagent, a polymerization initiator, and so on in the polymerization reaction of TFE. Furthermore, the preferred polymerization conditions are as follows: the polymerization temperature is from 10 to 95° C., the polymerization pressure is from 0.5 to 4.0 MPa, and the polymerization period of time is from 100 to 520 minutes.

Examples of the emulsifier preferably applicable include fluorine-containing organic acids such as perfluorooctanoic acid, perfluorononanoic acid, perfluoro-2,5-dimethyl-3,6-dioxanonanoic acid and perfluorooctanesulfonic acid, and ammonium salts or alkali metal salts (lithium salts, sodium salts, and potassium salts) thereof. An emulsifier may be used singly, or two or more emulsifiers may be used in combination. Examples of the stabilization coagent preferably applicable include paraffin wax, fluorine-based oils, fluorine-based solvents and silicone oil. A stabilization coagent may be used singly, or two or more stabilization coagent may be used in combination.

The polymerization initiator preferably applicable is a water-soluble radical initiator, a water-soluble oxidation-reduction catalyst, or the like. Examples of the water-soluble radical initiator preferably applicable include persulfates such as ammonium persulfate and potassium persulfate, and water-soluble organic peroxides such as disuccinic acid peroxide, bisglutaric acid peroxide and tert-butylhydroperoxide. A polymerization initiator may be used singly, or two or more polymerization initiators may be used in combination. It is preferable to use a mixed system of a persulfate and disuccinic acid peroxide.

A concentration of the TFE copolymer in a dispersion liquid of the TFE copolymer obtained by the emulsion polymerization is preferably from 10 to 45% by mass. If the TFE copolymer concentration is too low, it will be difficult to coagulate the TFE copolymer. On the other hand, if it is too high, part of the TFE copolymer will remain uncoagulated to cause white turbidity of a coagulation solution. The TFE copolymer concentration is preferably from 15 to 45% by mass, more preferably from 20 to 43% by mass.

The fine powder can be obtained from the emulsion polymerization solution by a known method. Namely, the TFE copolymer dispersion liquid is diluted with water so that the concentration thereof becomes from 10 to 20% by mass, and then is vigorously stirred to coagulate. Depending on the circumstances, pH may be controlled, or a coagulation coagent such as an electrolyte or a water soluble organic solvent may be added. Then the solution is stirred appropriately, whereby polymer fine particles coagulated are separated from water, followed by granulation, spherization and drying.

The drying is normally carried out in a state of causing little flow of wet powder obtained by the coagulation, preferably in a state of leaving it at rest, by means of vacuum, a high frequency wave, hot air or the like.

The fine powder of TFE copolymer has property of being fibrillated even by a small shear force to lose the state of original crystalline structure after completion of polymerization. It is undesirable that particles of the fine powder be brought in contact or friction with each other, particularly, at a high temperature, in order to prevent increase of extrusion pressure, particularly, in the paste extrusion. The drying is preferably carried out at from 10 to 250° C., particularly preferably from 100 to 200° C. For the fine powder of TFE copolymer, an average particle size of primary particles is preferably in a range of from 0.1 to 0.5 μm, particularly preferably in a range of from 0.14 to 0.38 μm, and a standard specific gravity is preferably in a range of from 2.14 to 2.25, particularly preferably in a range of from 2.16 to 2.21. In a case where the standard specific gravity falls within the range, a molding pressure is low and a resulting molded product is superior in dimensional stability and surface smoothness. Furthermore, the fine powder of TFE copolymer preferably remains not undergoing melt molding and has a paste extrusion pressure of from 24.5 to 73.5 MPa, particularly preferably the fine powder remains not undergoing melt molding and has a paste extrusion pressure of from 34.5 to 55.5 MPa. In addition, the fine powder of TFE copolymer preferably has a bulk density of from 0.35 to 0.58 g/ml.

The fine powder of TFE copolymer of the present invention is applicable to the paste extrusion.

The paste extrusion is a molding method in which the fine powder of TFE copolymer is mixed with a lubricant to impart fluidity to the fine powder of TFE copolymer and in which it is extruded into a molded product such as a film, a tube, or the like. A mixing ratio of the lubricant is optionally selected so that the fine powder of TFE copolymer can possess fluidity. It is usually from 10 to 30% by mass relative to the total amount of the fine powder of TFE copolymer and the lubricant, particularly preferably from 15 to 20% by mass. The lubricant preferably used is Naphtha or one of petroleum hydrocarbons having a dry point of at least 100° C.

Furthermore, an additive such as a pigment can be added for coloring and various fillers can be added for imparting strength, electric conductivity, and so on.

The paste extrusion pressure for the fine powder of TFE copolymer is preferably from 24.5 to 73.5 MPa, particularly preferably from 34.5 to 55.5 MPa.

The TFE copolymer can undergo paste extrusion into molded products of various shapes such as tubular, sheet-like, film-like, fibrous shapes, and so on. They are used as tubes, wire coatings, seal materials, porous films, filters, and so on.

Now the present invention will be described in further detail with reference to Examples and Comparative Examples. However, the present invention is by no means thereby restricted. Measuring methods for properties of the TFE copolymer and fine powder are as follows.

(A) Average primary particle size of TFE copolymer (unit: μm): measured by means of a laser scattering particle size distribution analyzer "LA-920" (trade name, manufactured by HORIBA, Ltd.).

(B) Average particle size of fine powder (unit: μm): measured in conformity with JIS K6891. 20-, 30-, 40-, 45- and 60-mesh standard sieves were sequentially put together in order from the top, and the powder was placed on the 20-mesh sieve to be sieved. A mass of powder particles remaining on each sieve was obtained. The 50% particle size calculated by a logarithmic probability paper based on the obtained masses was taken as the average particle size.

(C) Apparent density (unit: g/ml): measured in conformity with JIS K6891. A sample was dropped from a funnel set above, into a stainless steel weighing bottle with an inner volume of 100 ml, and a part of the sample bulging from the weighing bottle was scraped off with a flat plate. Thereafter, the weight of the sample remaining in the weighing bottle was measured and a value obtained by dividing the weight of the sample by the inner volume of the weighing bottle was taken as the apparent density.

(D) Standard specific gravity (hereinafter also referred to as "SSG"): measured in conformity with ASTM D1457-91a and D4895-91a. 12.0 g of a resin was weighed and kept in a cylindrical die with an inner diameter of 28.6 mm under a pressure of 34.5 MPa for 2 minutes. It was inserted into an oven at 290° C. and the temperature was raised at a rate of 120° C./hr. It was kept at 380° C. for 30 minutes. Then the temperature was decreased at a rate of 60° C./hr and the die was kept at 294° C. for 24 minutes. The molded product was kept in a desiccator at 23° C. for 12 hours, and thereafter a specific gravity of the molded product relative to water at 23° C. was measured. The result was taken as the standard specific gravity. The smaller the value of SSG, the greater the molecular weight.

(E) Thermal instability index TII: measured in conformity with ASTM D1457-91a and D4895-91a. A sample for an extended specific gravity (hereinafter referred to as "ESG") was prepared in the same manner as in the case of SSG except that the retention time at 380° C. was 360 minutes.

It was calculated based on the formula TII=(ESG−SSG)× 1000.

The smaller the value of TII, the less the molecular weight changes in the case where the retention time at 380° C. is longer. Namely, it shows superiority in heat resistance.

(F) Paste extrusion pressure: 226.8 g of polymer powder and 43.2 g of a hydrocarbon lubricant: Isopar H (trade name manufactured by Exxon Company) were mixed in a glass bottle, and matured at room temperature (25° C.) for at least eight hours. Then the above mixture was filled in a cylinder having an inner diameter of 39.4 mm and kept for two minutes while exerting a load of 55 kg to a piston inserted in the cylinder. The above mixture was taken out of the cylinder, put into an extrusion die (die angle: 20°, and diameter of orifice: 0.27 mm) with a cylinder (inner diameter: 40.3 mm) and extruded at a ram rate of 20 mm/min and at a die temperature of 40° C., thereby obtaining a string-like product (beading). It is noted here that RR is a ratio of a cross-sectional area of a cylinder (Ac) of an extruder to a cross-sectional area of a die (Ad), namely, a reduction ratio (RR) is defined as RR=Ac/Ad. In this example, RR was 1000. A paste extrusion pressure (MPa) was obtained as a value calculated by dividing an extrusion force at a range in which a pressure is in an equilibrium state in the latter of extrusion, by the cylinder cross-sectional area.

(G) Transparency and surface smoothness (moldability): transparency and surface smoothness (moldability) were determined with a wire coating material produced by the following procedure. A hydrocarbon lubricant of Isopar H (trade name manufactured by Exxon Company) was added in a rate of 18% by mass to 700 g of a fine powder of PTFE, they were blended by rotation at 100 rpm for 30 minutes. The blended resin was matured at room temperature for at least eight hours. After preforming, a wire (AWG20 composed of 19 nickel-plated strands of 0.202 mm and having the outer diameter of 1.01 mm) was continuously coated with the resin under a condition of RR=1200 by an extruder. It was made to pass through an oven for removal of the lubricant at 250° C., sintered in an oven at 425° C. and quenched to room temperature. The transparency was evaluated by eye observation to observe the outer appearance of the wire coating material obtained. The evaluation results were represented by ○ and X according to the following criteria. ○: appearance in which the coating resin is as transparent as the original color of the wire is visible, and X: appearance in which the coating resin is milky white, as compared with "○", so that the original color of the wire is whitened to become invisible. The surface smoothness was evaluated by eye observation to observe the outer appearance of the wire coating material obtained. The evaluation results were represented by ○ and X according to the following criteria. ○: smooth outer appearance and X: no smooth outer appearance.

(H) Content of units based on comonomer: determined from infrared absorbance measured for a thin-film disk prepared by pressing the raw powder of TFE copolymer. A content of units based on CTFE was obtained in conformity with the method described in JP-B-04-3765, i.e., by multiplying a ratio of absorbance at 957 $cm^{-1}$/absorbance at 2360 $cm^{-1}$ by 0.58. A content of units based on perfluoropropylvinyl ether (hereinafter referred to as "PPVE") was obtained in conformity with the method described in the brochure of WO00/02935, i.e., by multiplying a ratio of absorbance at 995 $cm^{-1}$/absorbance at 935 $cm^{-1}$ by 0.14. A content of units based on HFP was obtained in conformity with the method described in JP-B-37-4643, i.e., by multiplying a ratio of absorbance at 982 $cm^{-1}$/absorbance at 935 $cm^{-1}$ by 0.3.

On the other hand, a content of units based on the monomer of the formula (1) was obtained by calculation on the assumption that the whole amount of the monomer charged was taken into the polymer, by confirming that the peak of the monomer of the formula (1) disappeared by gas chromatography analysis of the gas phase in an autoclave after polymerization.

(I) Heat resistance: an about 30 cm-long test piece obtained by cutting the TFE copolymer-coated wire prepared in the same manner as in the procedure of (G) was kept in an oven at 370° C. for 24 hours to effect heat treatment. Then about 10 mg of the TFE copolymer cut out from the test piece was analyzed by a differential scanning calorimeter. The temperature was raised to 200° C. under a nitrogen atmosphere, was once kept thereat, was further raised to 380° C. at a rate of 10° C./min, and was then decreased from 380° C. to 200° C. at a rate of 10° C./min to measure a heat of crystallization. A crystallization calorie a (J/g) after the heat treatment was determined from an area enclosed by a curve of a resulting chart curve and tangent lines at 275° C. and at 340° C. Furthermore, with respect to the PTFE-coated wire before the heat treatment at 370° C., a crystallization calorie b (J/g) was also determined in the same manner. A difference between the crystallization calories before and after the heat treatment, (a–b), was obtained. J. Appl. Polym. Sci., 17, 3253 (1973) describes a relation between molecular weight and heat of crystallization of PTFE, and shows that the larger the crystallization calorie, the smaller the molecular weight. It is shown that as the value of (a–b) increases, the molecular weight decreases, which indicates that the heat resistance is low.

(J) Outer appearance of tube: a preform of the TFE copolymer was prepared in the same manner as in (G) and a tube having an outer diameter of about 5 mm and an inner diameter of about 4 mm was formed at RR=1300 and at a rate of 50 mm/min, followed by sintering to obtain a tube. The outer appearance of the tube was evaluated by eye observation to observe the resulting tube. The evaluation results were represented by ○ and Δ according to the following criteria. ○: a state wherein the surface is smooth and the radial size is stable, and Δ: a state wherein the surface is slightly rough and the radial size is slightly instable.

EXAMPLE 1

Charged into a 100 L stainless steel autoclave equipped with a baffle plate and a stirrer were 6 g of ammonium perfluorooctanoate, 565 g of paraffin wax and 60 liters of deionized water. The air in the autoclave was replaced with nitrogen and then the pressure was reduced. 42 g of a comonomer $CF_2=CF-O-CF_2CF_2CF=CF_2$ (hereinafter referred to as "PFBVE") was charged into the autoclave. The pressure was increased with TFE and the temperature was raised to 67° C. under stirring. Then the pressure was raised to 1.85 MPa with TFE and 5.0 g of disuccinic acid peroxide and 0.28 g of ammonium persulfate dissolved in warm water at about 70° C. were injected into the autoclave. The inner pressure decreased to 1.83 MPa in about 4 minutes. Polymerization was made to proceed while adding TFE to keep inner pressure of the autoclave at 1.85 MPa. 84 g of ammonium perfluorooctanoate was introduced at a point where the amount of TFE added reached 3.0 kg. 4 g of methanol and 3.2 g of ammonium persulfate dissolved in pure water at an ordinary temperature were added at a point where the amount of TFE added reached 24.3 kg. The reaction was terminated at a point where the amount of TFE added reached 32.5 kg. The gas of the vapor phase in the autoclave was sampled and subjected to gas chromatography analysis, and it was confirmed thereby that the peak of PFBVE having been detected in the vapor phase before polymerization disappeared. TFE in the autoclave was released into the atmosphere. The polymerization period was 3 hours and 13 minutes.

The emulsified dispersion liquid of the TFE copolymer thus obtained was cooled and the supernatant paraffin wax was removed. The emulsified dispersion liquid had a solid content of about 34% by mass. The polymer had an average primary particle size of 0.20 µm. This emulsified dispersion liquid was diluted with pure water to a concentration of 12% by mass, and adjusted to 30° C. and stirred, thereby obtaining a wet fine powder. Then the powder was dried at 120° C. The fine powder of TFE copolymer obtained had an average particle size of 640 µm and a bulk density of 0.46 g/ml. The powder had a standard specific gravity of 2.189 and a TII of 2, thus showing good heat resistance.

Furthermore, the obtained TFE copolymer was analyzed by means of a differential thermal analyzer, and it was found that the copolymer had a melting point of 337.9° C. FIG. 1 shows a chart of the analysis result.

COMPARATIVE EXAMPLE 1

The reaction was carried out in the same manner as in Example 1 except that the comonomer in Example 1 was charged in an amount of 8.0 g.

COMPARATIVE EXAMPLE 2

The reaction was carried out in the same manner as in Example 1 except that 17.6 g of CTFE was charged instead of the comonomer in Example 1.

COMPARATIVE EXAMPLE 3

The reaction was carried out in the same manner as in Example 1 except that 40.2 g of PPVE was charged instead of the comonomer in Example 1.

Table 1 shows properties of polymers in the Example and the Comparative Examples.

TABLE 1

|  | Example 1 | Comparative Example 1 | Comparative Example 2 | Comparative Example 3 |
|---|---|---|---|---|
| Comonomer contained | PFBVE | PFBVE | CTFE | PPVE |
| Content of units based on comonomer (% by mass) | 0.13 | 0.03 | 0.05 | 0.10 |

TABLE 1-continued

|  | Example 1 | Comparative Example 1 | Comparative Example 2 | Comparative Example 3 |
|---|---|---|---|---|
| Average primary particle size of TFE copolymer (µm) | 0.20 | 0.26 | 0.23 | 0.19 |
| Bulk density (g/ml) | 0.46 | 0.53 | 0.50 | 0.47 |
| Average particle size of fine powder (µm) | 640 | 570 | 650 | 490 |
| SSG | 2.189 | 2.180 | 2.204 | 2.187 |
| Paste extrusion pressure (MPa) | 45.4 | 77.5 | 41.6 | 42.8 |
| Heat resistance (TII) | 2 | 9 | 47 | 0 |
| Transparency | ◯ | Impossible to mold | X | ◯ |
| Moldability (surface smoothness) | ◯ | Impossible to mold | ◯ | X |

EXAMPLE 2

Charged into a 100 L stainless steel autoclave equipped with a baffle plate and a stirrer were 6 g of ammonium perfluorooctanoate, 565 g of paraffin wax and 60 liters of deionized water. The air in the autoclave was replaced with nitrogen and then the pressure was reduced. 47 g of PFBVE was charged into the autoclave. The pressure was increased with TFE and the temperature was raised to 67° C. under stirring. Then the pressure was raised to 1.85 MPa with TFE and 5.0 g of disuccinic acid peroxide and 0.21 g of ammonium persulfate dissolved in warm water at about 70° C. were injected into the autoclave. The inner pressure decreased to 1.83 MPa in about 4 minutes. Polymerization was made to proceed while adding TFE to keep the inner pressure of the autoclave at 1.85 MPa.

84 g of ammonium perfluorooctanoate was introduced at a point where the amount of TFE added reached 3.4 kg. 4 g of methanol and 3.2 g of ammonium persulfate dissolved in pure water at an ordinary temperature were added at a point where the amount of TFE added reached 32.4 kg. The reaction was terminated at a point where the amount of TFE added reached 36.0 kg. The gas of the vapor phase in the autoclave was sampled and subjected to gas chromatography analysis. It was confirmed that the peak of PFBVE, which had been detected in the vapor phase before polymerization, disappeared. Then TFE in the autoclave was released into the atmosphere. The polymerization period was 3 hours and 49 minutes.

The emulsified dispersion liquid of the TFE copolymer thus obtained was cooled and the supernatant paraffin wax was removed. The emulsified dispersion liquid had a solid content of about 35% by mass. The polymer had an average primary particle size of 0.22 µm. This emulsified dispersion liquid was diluted with pure water to a concentration of 12% by mass, and adjusted to 30° C. and stirred, thereby obtaining a wet fine powder. Then the powder was dried at 120° C. The fine powder of TFE copolymer obtained had an average particle size of 650 µm and a bulk density of 0.48 g/ml. The powder had a standard specific gravity of 2.176 and a TII of −1, thus showing good heat resistance. Furthermore, the obtained TFE copolymer was analyzed by means of a differential thermal analyzer, and it was found that the copolymer had a melting point of 339.1° C.

EXAMPLE 3

The reaction was carried out in the same manner as in Example 2 except that 62 g of PFBVE was charged. The polymerization period was about 4 hours. It was confirmed by the gas chromatography analysis that the peak of PFBVE disappeared from the vapor phase in the autoclave at the time of completion of the polymerization. The emulsified dispersion liquid of the TFE copolymer thus obtained was cooled and the supernatant paraffin wax was removed. The emulsified dispersion liquid had a solid content of about 36% by mass. The polymer had an average primary particle size of 0.20 µm. This emulsified dispersion liquid was diluted with pure water to a concentration of 12% by mass, and adjusted to 30° C. and stirred, thereby obtaining a wet fine powder. Then the powder was dried at 120° C. The fine powder of TFE copolymer obtained has an average particle size of 630 µm and a bulk density of 0.47 g/ml. The powder had a standard specific gravity of 2.173 and a TII was −1, thus showing good heat resistance. Furthermore, the obtained TFE copolymer was analyzed by means of a differential thermal analyzer, and it was found that the copolymer had a melting point of 338.9° C.

EXAMPLE 4

The reaction was carried out in the same manner as in Example 2 except that 81 g of PFBVE was charged. The polymerization period was 4 hours and 5 minutes. It was confirmed by the gas chromatography analysis that the peak of PFBVE disappeared from the vapor phase in the autoclave. The emulsified dispersion liquid of the TFE copolymer thus obtained was cooled and the supernatant paraffin wax was removed. The emulsified dispersion liquid had a solid content of about 36% by mass. The polymer had an average primary particle size of 0.21 µm. This emulsified dispersion liquid was diluted with pure water to a concentration of 12% by mass, and adjusted to 30° C. and stirred, thereby obtaining a wet fine powder. Then the powder was dried at 120° C. The fine powder of TFE copolymer obtained had an average particle size of 640 µm and a bulk density of 0.47 g/ml. The powder had a standard specific gravity of 2.178 and a TII of 2, thus showing good heat resistance. Furthermore, the obtained TFE copolymer was analyzed by means of a differential thermal analyzer, and it was found that the copolymer had a melting point of 338.1° C.

EXAMPLE 5

The reaction was carried out in the same manner as in Example 2 except that 120 g of PFBVE was charged. The polymerization period was 4 hours and 50 minutes. It was confirmed by the gas chromatography analysis that the peak of PFBVE disappeared from the vapor phase in the autoclave. The emulsified dispersion liquid of the TFE copolymer thus obtained was cooled and the supernatant paraffin wax was removed. The emulsified dispersion liquid had a solid content of about 36% by mass. The polymer had an average primary particle size of 0.19 µm. This emulsified dispersion liquid was diluted with pure water to a concentration of 12% by mass, and adjusted to 30° C. and stirred, thereby obtaining a wet fine powder. Then the powder was dried at 120° C. The fine powder of TFE copolymer obtained had an average particle size of 530 µm and a bulk density of 0.45 g/ml. The powder had a standard specific gravity of 2.170 and a TII of −1, thus showing good heat resistance. Furthermore, the obtained TFE copolymer was analyzed by means of a differential thermal analyzer, and it was found that the copolymer had a melting point of 337.2° C.

TABLE 2

|  | Example 2 | Example 3 | Example 4 | Example 5 |
| --- | --- | --- | --- | --- |
| Content of units based on PFBVE (% by mass) | 0.13 | 0.17 | 0.22 | 0.33 |
| Average primary particle size of TFE copolymer (µm) | 0.22 | 0.20 | 0.21 | 0.19 |
| Bulk density (g/ml) | 0.48 | 0.47 | 0.47 | 0.45 |
| Average particle size of fine powder (µm) | 650 | 630 | 640 | 530 |
| SSG | 2.176 | 2.173 | 2.178 | 2.170 |
| Paste extrusion pressure (MPa) | 41.6 | 39.1 | 42.1 | 47.4 |
| Heat resistance (TII) | −1 | −1 | 2 | −1 |
| Transparency | ◯ | ◯ | ◯ | ◯ |
| Moldability (surface smoothness) | ◯ | ◯ | ◯ | ◯ |

EXAMPLE 6

Charged into a 100 L stainless steel autoclave equipped with a baffle plate and a stirrer were 6 g of ammonium perfluorooctanoate, 565 g of paraffin wax and 60 liters of deionized water. The air in the autoclave was replaced with nitrogen and then the pressure was reduced. 62 g of PFBVE was charged into the autoclave. The pressure was increased with TFE and the temperature was raised to 67° C. under stirring. Then the pressure was raised to 1.85 MPa with TFE and 5.0 g of disuccinic acid peroxide and 0.21 g of ammonium persulfate dissolved in warm water at about 70° C. were injected into the autoclave. The inner pressure decreased to 1.83 MPa in about 4 minutes. Polymerization was made to proceed while adding TFE to keep the inner pressure of the autoclave at 1.85 MPa. 84 g of ammonium perfluorooctanoate was introduced at a point where the amount of TFE added reached 3.4 kg. 83 g of HFP was added at a point where the amount of TFE added reached 32.4 kg. The reaction was terminated at a point where the amount of TFE added reached 36.0 kg. The gas of the vapor phase in the autoclave was sampled and subjected to gas chromatography analysis. It was confirmed that the peak of PFBVE, which had been detected in the vapor phase before polymerization, disappeared. Then TFE in the autoclave was released into the atmosphere. The polymerization period was 4 hours and 15 minutes.

The emulsified dispersion liquid of the TFE copolymer thus obtained was cooled and the supernatant paraffin wax was removed. The emulsified dispersion liquid had a solid content of about 37% by mass. The polymer had an average primary particle size of 0.20 µm. This emulsified dispersion liquid was diluted with pure water to a concentration of 12% by mass, and adjusted to 30° C. and stirred, thereby obtaining a wet fine powder. Then the powder was dried at 120° C. The fine powder of TFE copolymer obtained has an average particle size of 545 µm and a bulk density of 0.47 g/ml. The powder had a standard specific gravity of 2.163 and a TII of −5, thus showing good heat resistance. Furthermore, the obtained TFE copolymer was analyzed by means of a differential thermal analyzer, and it was found that the copolymer had a melting point of 338.9° C.

COMPARATIVE EXAMPLE 4

The reaction was carried out in the same manner as in Example 6 except that the comonomer in Example 6 was charged in an amount of 19.4 g. It was confirmed by the gas chromatography analysis that the peak of PFBVE disappeared from the vapor phase in the autoclave.

TABLE 3

|  | Example 6 | Comparative Example 4 |
|---|---|---|
| Comonomer | PFBVE/HFP | PFBVE/HFP |
| Content of units based on comonomer (% by mass) | 0.17/0.009 | 0.05/0.010 |
| Average primary particle size of TFE copolymer (μm) | 0.20 | 0.22 |
| Bulk density (g/ml) | 0.47 | 0.49 |
| Average particle size of fine powder (μm) | 545 | 595 |
| SSG | 2.163 | 2.177 |
| Paste extrusion pressure (MPa) | 42.3 | 44.2 |
| Heat resistance (TII) | −5 | −3 |
| Transparency | ◯ | X |
| Moldability (surface smoothness) | ◯ | ◯ |
| Crystallization calorie a (J/g) after heat treatment | 29.1 | 36.7 |
| Crystallization calorie b (J/g) before heat treatment | 28.8 | 30.0 |
| Heat resistance (a − b) | 0.3 | 6.7 |
| Outer appearance of tube | ◯ | Δ |

From the comparison between Example 6 and Comparative Example 4, it is clear that the transparency, heat resistance and outer appearance of tube are not enough if the content of units based on PFBVE is off the range defined in Claim 1.

INDUSTRIAL APPLICABILITY

The TFE copolymer according to the present invention is excellent in paste extrudability and in heat resistance. Furthermore, the paste extruded product of the TFE copolymer according to the present invention is excellent in transparency as well. The TFE copolymer and the fine powder thereof according to the present invention are molded into wire coating materials, tubes, and so on, and they are suitable, particularly, for applications to parts around automobile and airplane engines requiring the high heat resistance and to medical equipment, precision machines, etc. requiring the high quality.

The entire disclosures of Japanese Patent Application No. 2002-355575 filed on Dec. 6, 2002 and Japanese Patent Application No. 2003-207631 filed on Aug. 15, 2003 including specifications, claims, drawings and summaries are incorporated herein by reference in their entireties.

What is claimed is:

1. A tetrafluoroethylene copolymer capable of undergoing paste extrusion comprising a unit based on tetrafluoroethylene and a unit based on a monomer represented by the following general formula (1), wherein a content of the unit based on the monomer represented by the general formula (1) is from 0.1 to 0.5% by mass, wherein a particle size of a primary particle is from 0.1 to 0.5 μm, wherein a standard specific gravity is from 2.14 to 2.25, wherein the copolymer is capable of undergoing paste extrusion at a pressure of from 24.5 to 73.5 MPa without undergoing melt molding, $$CF_2=CF-O-(CF_2)_nCF=CF_2 \qquad (1)$$

(wherein n is an integer of from 1 to 6).

2. A method for producing a tetrafluoroethylene copolymer comprising effecting an emulsion polymerization of tetrafluoroethylene with a monomer represented by the following general formula (1) under such a condition that a polymerization amount of the monomer represented by the general formula (1) is in a range of from 0.1 to 0.5% by mass, thereby obtaining a tetrafluoroethylene copolymer capable of undergoing paste extrusion which has a particle size of a primary particle of from 0.1 to 0.5 μm and a standard specific gravity of from 2.14 to 2.25, wherein the copolymer is capable of undergoing paste extrusion at a pressure of from 24.5 to 73.5 MPa without undergoing melt molding, $$CF_2=CF-O-(CF_2)_nCF=CF_2 \qquad (1)$$

(wherein n is an integer of from 1 to 6).

3. The tetrafluoroethylene copolymer for paste extrusion according to claim 1, wherein n in the monomer represented by the formula (1) is from 2 to 5.

4. A paste extruded product obtained by paste extrusion of the tetrafluoroethylene copolymer as defined in claim 1.

* * * * *